US 6,452,359 B1

(12) United States Patent
Schwarz et al.

(10) Patent No.: US 6,452,359 B1
(45) Date of Patent: Sep. 17, 2002

(54) STARTING SYSTEM FOR AN ELECTRIC MOTOR

(75) Inventors: Marcos Guilherme Schwarz; Egidio Berwanger, both of Joinville,. SC (BR)

(73) Assignee: Empresa Brasileira de Compressores S/A Embraco, Joinville (BR)

(*) Notice: Subject to any disclaimer, the term of this patent is extended or adjusted under 35 U.S.C. 154(b) by 0 days.

(21) Appl. No.: 09/957,644

(22) Filed: Sep. 17, 2001

Related U.S. Application Data

(63) Continuation of application No. PCT/BR00/00024, filed on Mar. 17, 2000.

(30) Foreign Application Priority Data

Mar. 18, 1999 (BR) .......................................... 9902182-0

(51) Int. Cl.[7] ................................................. H02P 1/26
(52) U.S. Cl. ...................... 318/778; 318/783; 318/782; 361/22; 361/24; 361/26; 361/27
(58) Field of Search ................. 318/778, 783, 318/782; 361/22, 24, 26, 27

(56) References Cited

U.S. PATENT DOCUMENTS

| 4,047,082 | A |   | 9/1977 | Scheuer et al. ............. 318/221 |
| 4,334,162 | A | * | 6/1982 | Haag et al. ................. 310/68 C |
| RE31,367  | E | * | 8/1983 | D'Entremont ................ 361/27 |
| 5,021,915 | A | * | 6/1991 | Wandler et al. ............. 318/783 |
| 5,053,908 | A | * | 10/1991 | Cooper et al. ............... 318/783 |
| 5,428,493 | A | * | 6/1995 | Takeuchi et al. ............ 318/784 |
| 5,524,448 | A | * | 6/1996 | Schwanebeck et al. ....... 361/22 |
| 5,870,014 | A | * | 2/1999 | Nield et al. .................. 337/333 |

FOREIGN PATENT DOCUMENTS

FR        2 384 380        7/1979        ............. H02P/1/16

* cited by examiner

Primary Examiner—Robert E. Nappi
Assistant Examiner—Rita Leykin
(74) Attorney, Agent, or Firm—Darby & Darby

(57) ABSTRACT

An improvement in a starting system for an electric motor, which drives a hermetic compressor of refrigeration and comprises a main winding (1), and an auxiliary winding (2), which are energized by an electric current source (3), through a hermetic terminal (40) affixed to the outside of the compressor shell, the auxiliary winding (2) having a terminal connected to the electric current source (3) through a starting device (10) mounted inside the compressor shell and in series with a fusible element (20) to be opened when submitted to an electric current, in order to definitively interrupt the energization of the auxiliary winding (2) by means of the starting device (10), said hermetic terminal (40) being designed to receive an external starting device (50), in order to promote the selective connection between said other terminal of the auxiliary winding (2) and the electric current source (3) upon the definitive opening of the circuit defined by the fusible element (20) and the starting device (10).

2 Claims, 1 Drawing Sheet

STARTING SYSTEM FOR AN ELECTRIC MOTOR

This application is a continuation of PCT/BR00/00024 filed on Mar. 17, 2000.

FIELD OF THE INVENTION

The present invention refers to an improvement introduced in a starting system for an induction electric motor, particularly a starting system of the type installed inside the shell of a hermetic compressor of refrigeration, such as described in the co-pending patent applications of the same applicant and filed on Apr. 13, 1998 and Oct. 2, 1998.

BACKGROUND OF THE INVENTION

In the conventional constructions, an electric motor of the type mentioned above has a main winding and an auxiliary winding, which are supplied with electric current from an electric current source through a starting circuit of the electric motor usually comprising a starting relay or a thermistor (PTC), mounted to a casing to be electrically connected to the external wall of the shell of the compressor, in which this electric motor operates.

In these constructions, a terminal of each of the main and auxiliary windings of this electric motor is directly connected to the electric current source, through a switching element of this starting circuit, whereas another terminal of the auxiliary winding is electrically connected to said electric current source, through the starting relay or PTC.

The construction using a starting relay has, as disadvantages, the possibility of the relay contacts be closed in undesirable occasions or be fused in a situation of high discharge of electrical interference currents, and the occurrence of sparks.

The construction using a starting PTC does not avoid that, in practice, the resistance of the PTC is incapable of effectively interrupting the current supply to the auxiliary winding, allowing a residual current to remain through the latter, resulting in energetic consumption of the electric motor. Besides, the existence of a current flowing through the PTC keeps it heated, which makes difficult new starts of the electric motor, since a new start will only occur when the PTC presents a determined temperature in which there is no significant resistance to the passage of electric current.

Besides the inconveniences resulting from the provision of a starting relay or a PTC for obtaining the start of the electric motor, this conventional of providing the starting circuit with such elements externally to the compressor causes some inconveniences, such as difficulty and discomfort in mounting said casing to the compressor and the exposure thereof to impacts upon displacement of the compressor, for example, during transportation, which may result in an inadvertent disconnection of the casing containing the starting circuit from the compressor shell.

Aiming at dispensing the use of a starting relay or a starting PTC in the starting circuit of the motors considered herein, in order to avoid the inconveniences resulting from the utilization of said components, there has been proposed the solution defined in the co-pending patent application, filed on Oct. 2, 1998, claiming the national priority of the prior patent application PI 9801913.9 (abandoned), according to which the starting system comprises: a switching means provided between the electric current source and the auxiliary winding; and an actuating means provided inside the electric motor and subject to a magnetic field produced by the main winding upon energization thereof for operation of the electric motor, said actuating means closing the switching means, in order to energize the auxiliary winding, when the starting current passing through the main winding produces a magnetic field of a certain intensity, and opening the switching means, in order to de-energize the auxiliary winding, when the normal operation current through the main winding produces a magnetic field with less intensity.

This starting system mounted inside the compressor shell is highly advantageous, because it eliminates the inconveniences mentioned above related to the use of the starting relay and PTC. However, since the switching means is positioned inside the compressor shell, in case said element fails, after the compressor has been installed in a refrigeration system, the repair operation will require the complete substitution of the compressor, which is a long and costly procedure.

DISCLOSURE OF THE INVENTION

Thus, it is a general objective of the present invention to provide an improvement in a starting system for an electric motor of the type installed inside the shell of a hermetic compressor and which may be easily and rapidly discarded in operational terms and substituted by a starting system, which may be attached to the outside of the compressor shell, with no need of substituting said compressor.

The present improvement is applied to a starting system for an electric motor, which drives a hermetic compressor of refrigeration and comprises a main winding, which is energized by an electric current source; and an auxiliary winding, having a terminal directly connected to the electric current source and the opposite terminal connected to the electric current source through a starting device mounted to the compressor, inside the shell thereof, the main winding and the auxiliary winding being connected to the electric current source by means of contact terminals of a hermetic terminal affixed to the outside of the compressor shell.

According to the present invention, the starting device is mounted in series with a fusible element, to be opened when submitted to an electric current of a certain intensity, in order to definitively interrupt the energization of the auxiliary winding by means of the starting device, said hermetic terminal being designed to receive an external starting device, in order to promote the selective connection between said other terminal of the auxiliary winding and the electric current source upon the definitive opening of the circuit defined by the fusible element and the starting device.

The provision of the fusible element in series with the starting device internal to the compressor shell allows, in case said starting device fails, an electric current to be applied trough said starting device and said fusible element, with an intensity superior to that of the operational and starting levels of the compressor, but sufficient to provoke the definitive opening of the fusible element and the operational discard of the starting device mounted in series with said fusible element. With the operational discard of the starting device inside the compressor shell, another starting device, of any adequate construction, may be then rapidly and easily adapted to the hermetic terminal affixed outside the compressor shell, re-establishing the control of the selective connection between the auxiliary winding and the electric current source. The operational capability of the compressor may be thus re-established, with no need of replacing or even dismounting the same.

BRIEF DESCRIPTION OF THE DRAWINGS

The invention will be described below, based on the appended drawings, in which.

BEST MODE OF CARRYING OUT THE INVENTION

The present invention will be described in relation to an electric motor of the type used in a refrigeration compressor, including a main winding 1 and an auxiliary winding 2 supplied by an electric current source 3, such as, for example, the alternating current power line.

During the start of the electric motor, a starting current, with an intensity usually superior to that of a normal operation current of the electric motor, is transmitted to the main winding 1 of the electric motor, generating an intense magnetic field. According to the known techniques, during start of the electric motor, the starting current activates a starting circuit, not illustrated, which permits the electric current to pass to the auxiliary winding 2, during a certain time interval, which varies as a function of the conducting characteristics of the starting circuit, said current passage to the auxiliary winding 2 being generally interrupted when the current passing through the main winding 1 reaches a determined value, substantially corresponding to a normal operation current of the electric motor.

According to the present invention and as illustrated in the appended figures, the energization of the auxiliary winding 2 of the electric motor occurs, during start thereof, through a starting device 10, which is operatively connected to the auxiliary winding 2 and to the electric current source 3 and which is mounted inside the compressor shell.

A possible constructive solution for the starting device may the one described in the co-pending patent applications aforementioned, according to which the starting device has an actuating element subject to the intensity of the magnetic field generated by the passage of the electric current through the main winding, in order to actuate a switch provided between the auxiliary winding 2 and the electric current source 3, opening and closing the supply circuit of the auxiliary winding 2, as a function of the current passing through the main winding of the electric motor.

Figure 1:
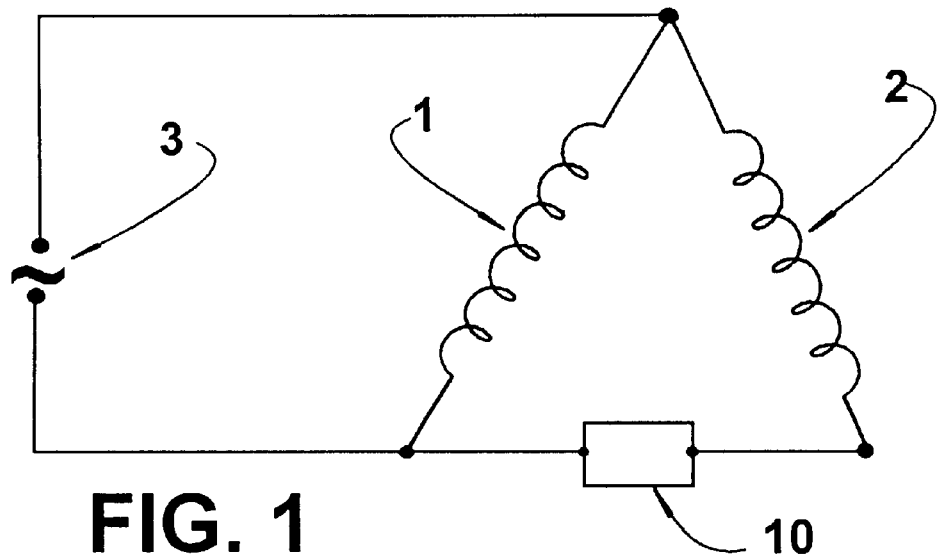
FIG. 1 shows, schematically, the main and auxiliary windings of an electric motor, which are coupled to a starting device mounted inside the compressor shell, according to a prior art construction.

Such a construction is found schematically illustrated in FIG. 1, in which a starting device 10 is connected between a terminal of the main winding 1 and a terminal of the auxiliary winding 2. In this type of construction, a defect in the starting device can only be repaired by dismounting and replacing the compressor.

Figure 2:
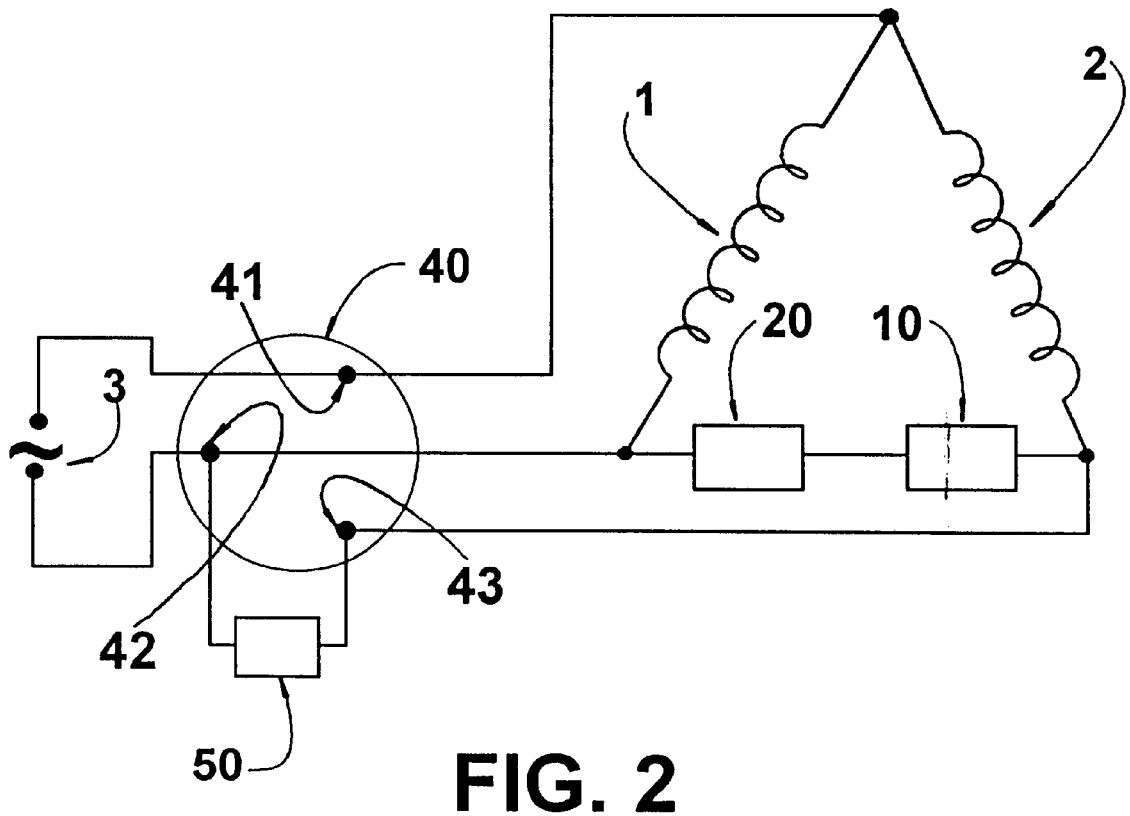
FIG. 2 is a similar view to that of FIG. 1, but illustrating the starting device mounted in series with a fusible element and with the main and auxiliary windings still coupled to a hermetic terminal outside the compressor shell, according to the present invention.

According to the present invention and as illustrated in FIG. 2, a fusible element 20, of adequate construction, is mounted in series with the starting device 10, thus being also located between one of the terminals of the auxiliary winding 2 and one of the terminals of the main winding 1, which terminal, on its turn, is electrically connected to the electric current source 3. As illustrated and well known in the art, the other terminals of the main and auxiliary windings 1 and 2 are directly connected to each other and to the electric current source 3.

The fusible element 20 is constructed in order to maintain the auxiliary winding 2 electrically connected to the electric current source 3 through the starting device 10, while the electric current applied to these elements is maintained below a determined break value, which is higher than the maximum value which the electric current may reach in the different operational conditions of the motor, there being included the value of the starting current of the motor. However, in case the electric current passing through the fusible element 20 is higher than the determined break value, the fusible element will be opened, interrupting, definitively, the connection between a terminal of the auxiliary winding 2 and the electric current source of the motor, discarding the starting device 10, causing no damage to the other parts of the motor or to the supply circuit thereof. Still according to the present invention, there is provided a hermetic terminal 40, of known construction, affixed outside the compressor shell and provided with contact terminals 41, 42 land 43, in order to establish the electric connection between the terminals of the main winding 1 and auxiliary winding 2 and the electric current source 3.

Upon failure of the starting device 10 inside the compressor shell, in a condition in which the supply to the respective terminal of the auxiliary winding 2 is interrupted, there is no need for producing the fusing or opening of the fusible element 20.

However, when the starting device 10 fails in a condition in which it maintains the auxiliary winding 2 permanently connected to the electric current source 3, an electric current, whose value is superior to the determined break value, is passed through the fusible element 20, so as to cause the breakage thereof and the operational discard of the starting device 10.

With the starting device 10 being operationally discarded, by failure in the opened condition or by breakage of the fusible element 20, it is possible to couple to the hermetic terminal 40 an external starting device 50, of any known construction, which can establish a selective electric connection of the auxiliary winding 2 with the electric current source 3, re-establishing the operational capability of the electric motor, with no need of dismounting or replacing the compressor.

What is claimed is:

1. An improvement in a starting system for an electric motor, which drives a hermetic compressor of refrigeration and comprises a main winding (1), which is energized by an electric current source (3); an auxiliary winding (2), having a terminal directly connected to the electric current source (3) and the opposite terminal connected to the electric current source (3) through a starting device (10) mounted to the compressor, inside the shell thereof, the main winding (1) and the auxiliary winding (2) being connected to the electric current source (3) by means of contact terminals of a hermetic terminal (40) affixed to the outside of the compressor shell, wherein the starting device (10) is mounted in series with a fusible element (20) to be opened when submitted to an electric current with a determined break value of a certain intensity, in order to definitively interrupt the energization of the auxiliary winding (2) by means of the starting device (10), said hermetic terminal (40) being designed to receive an external starting device (50), in order to promote the selective connection between said other terminal of the auxiliary winding (2) and the electric current source (3) upon the definitive opening of the circuit defined by the fusible element (20) and the starting device (10).

2. An improvement in a starting system, as in claim 1, wherein the determined break value of the electric current, which is passed through the fusible element (20), is superior to the maximum value that may be reached in the different operational conditions of the electric motor, but insufficient to cause damage to said electric motor, as well as to its supply circuit.

* * * * *